(12) United States Patent
Okubo

(10) Patent No.: US 6,897,588 B2
(45) Date of Patent: May 24, 2005

(54) BRUSHLESS MOTOR

(75) Inventor: Masayuki Okubo, Nitta-gun (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/718,686

(22) Filed: Nov. 24, 2003

(65) Prior Publication Data
US 2004/0113506 A1 Jun. 17, 2004

(30) Foreign Application Priority Data
Dec. 13, 2002 (JP) ........................................ 2002-362965

(51) Int. Cl.$^7$ .............................................. H02K 21/12
(52) U.S. Cl. ............................ 310/156.36; 310/156.45; 310/254; 310/261
(58) Field of Search ....................... 310/156.36, 156.45, 310/216, 261, 254

(56) References Cited

U.S. PATENT DOCUMENTS 5,877,574 A * 3/1999 Molnar ....................... 310/215
6,211,587 B1 * 4/2001 Enomoto et al. ............. 310/52

FOREIGN PATENT DOCUMENTS

JP          05083911 A  *  4/1993  .......... H02K/21/14

* cited by examiner

Primary Examiner—Thanh Lam
(74) Attorney, Agent, or Firm—Wenderoth, Lind & Ponack, L.L.P.

(57) ABSTRACT

A brushless motor 1 comprises a rotor 3 having a magnet 2 and a stator 4 having a stator core 8. The stator core 8 has teeth 11 provided at the front ends thereof with auxiliary grooves to realize a pseudo-multi-slot arrangement. The magnet 2 has an axial length of $L_M$ while the stator core 8 has an axial length of $L_S$, $L_S$ being greater than $L_M$ ($L_S > L_M$). The stator core 8 is provided at the opposite ends thereof with respective overhanging portions 15 that are not vis-à-vis the magnet 2. As a result, the magnetic flux is prevented from flowing into the stator core 8 through the axial end faces 8a thereof. In other words, the magnetic flux mostly flows into the stator core 8 through the front ends of the teeth. As a result, the pseudo-multi-slot effect produced by the auxiliary grooves is efficiently boosted to reduce cogging and other problems.

13 Claims, 4 Drawing Sheets

BRUSHLESS MOTOR

BACKGROUND OF THE INVENTION

1. Field of the Invention

This invention relates to a brushless motor and more particularly it relates to a brushless motor adapted to reduce the cogging torque thereof.

2. Related Art Statement

Brushless motors are used abundantly in various industrial fields in recent years because of the advantage that they do not have any mechanical contact point like between the brush and the commutator and therefore they are free from various problems, such as wear of a brush and electric noises. Examples of fields of application of brushless motors include industrial machines such as robots, IT devices such as personal computers and electric power steering (to be referred to as EPS hereinafter) devices for automobiles. Brushless motors are being increasingly used in these fields particularly due to the development of semiconductor control circuits. However, a so-called cogging torque can easily arise in brushless motors due to the attractive force between the permanent magnet at the rotor side and the core teeth at the stator side. The cogging torque can cause noises and vibrations and, in the case of the EPS device of an automobile, it can degrade steering feeling to the driver of the automobile.

A conceivable measure for reducing the cogging torque is the use of a stator having a multiple of slots in order to level off the unevenness of the torque of the brushless motor. However, it is not possible to infinitely increase the number of slots and hence the effect of a multi-slot stator is limited by the size of the motor. Techniques of using a pseudo-multi-slot stator obtained by forming a groove at the front end of each core tooth where the magnetic flux shows a high density so as to make the core tooth appear like a fork have been proposed as a breakthrough in the limit. For instance, Japanese Utility Model Application Publication No. 7-47981 describes a brushless motor having core teeth that are provided with respective auxiliary grooves arranged at a pitch equal to ½ of the slot pitch so as to produce an effect of doubling the member of slots.

However, as shown in FIGS. 6 and 7, either the magnet 51 and the stator core 52 are made to have a same length or the magnet 51 is made longer than the stator core 52 for the purpose of raising the output. Therefore, if a pseudo-multi-slot stator is realized by forming auxiliary grooves, the magnetic flux partly turns around the end faces 52a of the stator core 52 to lower the effect of the arrangement of auxiliary grooves. In other words, part of the magnetic flux does not pass through the front ends of the teeth and the cogging reducing effect of the pseudo-slots is not fully achieved because of the part of the magnetic flux unrelated to the auxiliary grooves. Measures for improving the effect of reducing the cogging torque by the arrangement of auxiliary grooves need to be taken.

It is therefore the object of the present invention to provide a brushless motor that can improve the effect of reducing the cogging torque by the arrangement of auxiliary grooves.

SUMMARY OF THE INVENTION

According to the invention, the above object is achieved by providing a brushless motor comprising a rotor having a magnet with an axial length of $L_M$ and a stator having a stator core provided with a plurality of teeth arranged peripherally vis-à-vis the magnet with an air gap interposed between them and the magnet and having auxiliary grooves formed at the front ends thereof, the axial length $L_S$ of the stator core being greater than the axial length $L_M$ of the magnet ($L_S > L_M$).

Since the axial length $L_S$ of the stator core is greater than the axial length $L_M$ of the magnet according to the invention, the stator core has portions thereof that are not vis-à-vis the magnet but axially outstanding from the respective axial ends of the magnet. As a result, the parts of the magnetic flux that turn from the respective end faces of the magnet toward the stator core are minimized. In other words, practically all the magnetic flux flows radially to the stator core by way of the front ends of the teeth. Therefore, the effect of the pseudo-multi-slots produced by the auxiliary grooves is efficiently boosted to reduce cogging and other problems.

In a brushless motor according to the invention, the stator core may be provided with overhanging portions thereof that are not vis-à-vis the magnet but axially outstanding from the respective axial ends of the magnet. The overhanging portions have an axial length X between 0.5 mm and 8.0 mm.

In a brushless motor according to the invention, the center of each of the auxiliary grooves of each of the teeth may be located on a radial line extended from the corresponding circumferential end face of the teeth. The position that is located on a radial line extended from the circumferential end face of the tooth is a position where the magnetic flux shows a high density along the front end of the tooth. Therefore, as the center of each of the auxiliary grooves is located on the position, the magnetic path of the reactive magnetic flux of the armature is narrowed and the magnetic path resistance becomes large. Accordingly, the reactive magnetic flux of the armature can hardly flow through the teeth to consequently reduce the influence of the armature reaction. Hence, it is now possible suppress demagnetization.

Additionally, in a brushless motor according to the invention, the auxiliary grooves may be made to have a width equal to the width of the slots separating adjacent teeth. With this arrangement, the sub-teeth produced by the auxiliary grooves at the front ends of the teeth are arranged peripherally at regular intervals to apparently increase the number of slots of the stator core.

A brushless motor according to the invention may be used as drive source of an electric power steering device. Then, noises and vibrations attributable to cogging can be reduced and the operation of steering the automobile is made very smooth to give the driver of the automobile good steering feeling.

DESCRIPTION OF THE PREFERRED EMBODIMENTS

Figure 1:
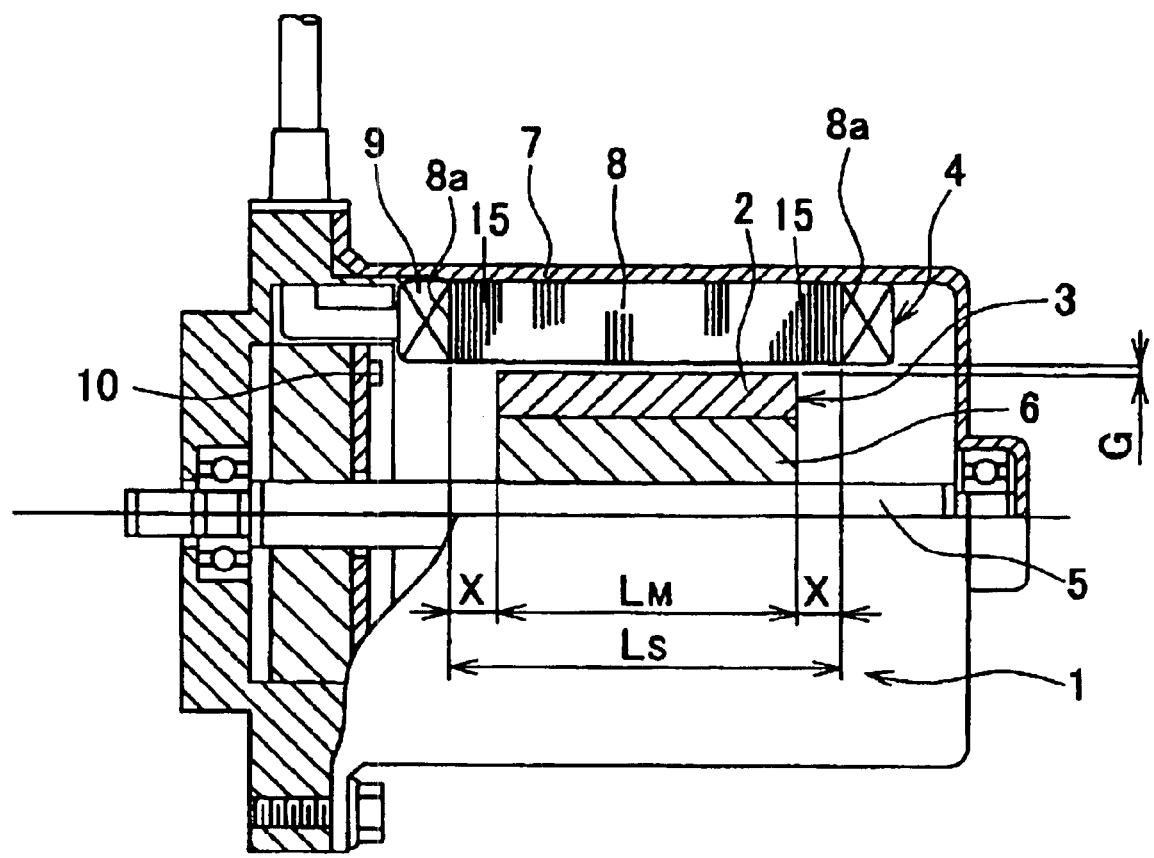
FIG. 1 is a schematic illustration of an embodiment of brushless motor according to the invention, showing its configuration.

Now, the present invention will be described in greater detail by referring to the accompanying drawings. FIG. 1 is a schematic illustration of an embodiment of a brushless motor according to the invention, showing its configuration. The illustrated brushless motor 1 (to be referred to simply as motor 1 hereinafter) is designed to operate as drive source of an EPS device. As shown in FIG. 1, the brushless motor 1 is of the inner rotor type and comprises a rotor 3 having a rotor magnet 2 (to be referred to simply as magnet 2 hereinafter) and a stator 4 arranged around the rotor 3. The motor 1 is driven as the driver of the automobile that is provided with the embodiment operates the steering wheel of the automobile and controlled according to the angle by which the steering column is turned, the running speed of the vehicle and so on so as to apply appropriate steering assisting force to the steering column by way of a reduction gear (not shown).

Figure 2:
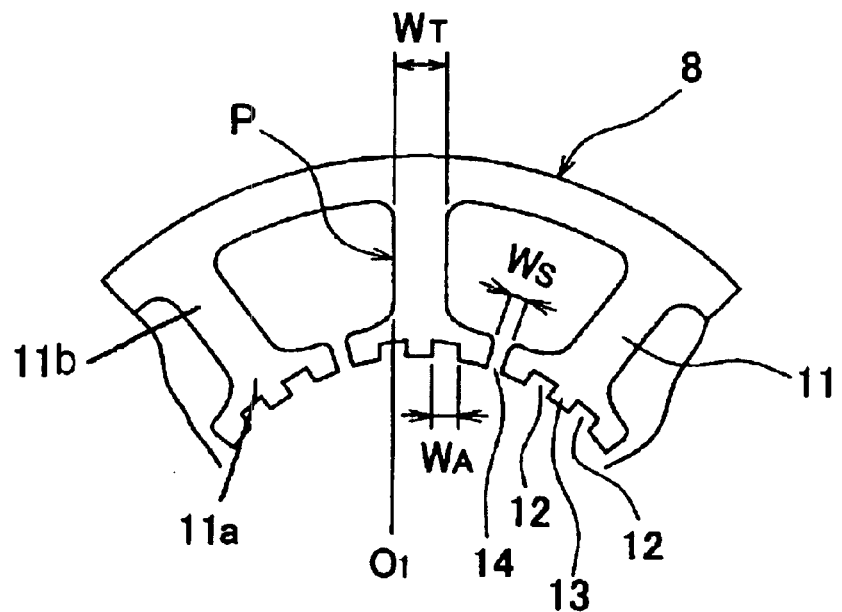
FIG. 2 is a schematic illustration of the stator core of the embodiment of the brushless motor of FIG. 1.

The rotor 3 includes a rotor core 6 fitted to a metal shaft 5 and the magnet 2 rigidly secured to the outer periphery of the rotor core 6. The magnet 2 is a four-pole magnet and is divided into four segments that are made of ferrite. The stator 4 includes a housing 7, a stator core 8 rigidly secured to the inner periphery of the housing 7 and a coil 9 wound around the stator core 8. FIG. 2 is a schematic illustration of the stator core of the embodiment of the brushless motor of FIG. 1. As shown in FIG. 2, the stator core 8 is provided with a plurality of teeth 11 projecting inwardly from the inner periphery thereof and the coil 9 of the brushless motor is formed as a wire is wound around the teeth 11 for distributed winding or concentrated winding.

Each of the teeth 11 is provided with a pair of auxiliary grooves 12 formed at the front end 11a thereof. The auxiliary grooves 12 are arranged vis-à-vis the air gap G produced between the magnet 2 and the front ends of the teeth 11 as so many radial recesses. Due to the auxiliary grooves 12, each of the teeth 11 is made to have a profile like that of a three-pronged fork at the front end 11a thereof. Thus, three sub-teeth 13 are formed at each of the teeth 11. The center position $O_1$ of each auxiliary groove 12 is aligned with the corresponding circumferential end face P of the base section 11b of the tooth 11. The center position $O_1$ of the auxiliary groove 12 that is located on the line extended from the end face P is a position where the magnetic flux shows a high density along the front end 11a of the tooth 11. Therefore, the reactive magnetic flux of the armature shows a large magnetic path resistance as the brushless motor is provided with auxiliary grooves 12 at the position. Thus, the reactive magnetic flux of the armature can hardly flow through the teeth 11 to consequently reduce the influence of the armature reaction. Hence it is now possible to suppress demagnetization.

The width $W_A$ of each auxiliary groove 12 is made equal to or slightly greater than the width $W_S$ of each slot 14. Thus, the sub-teeth 13 of the teeth 11 are arranged peripherally at regular intervals or approximately equal intervals. Thus, the number of slots of the stator core 8 is apparently increased to consequently reduce cogging as well as the inductance and the armature reaction. Note that the auxiliary grooves 12 and the slots 14 are skewed relative to each other by a skew angle of 20° for ½ of a slot.

A Hall sensor 10 is arranged in the inside of the housing 7 in order to detect the rotary position of the rotor 3. In the motor 1, the rotary position of the rotor is detected by the main magnetic flux of the magnet 2 and the Hall sensor 10 outputs a signal as the magnetic pole of the magnet 2 is switched. The electric current to the coil 9 is switched appropriately according to the detection signal of the Hall sensor 10 to form a revolving magnetic field that drives the rotor 3 to revolve.

In the motor 1, on the other hand, the axial length $L_M$ of the magnet 2 is made smaller than the axial length $L_S$ of the stator core 8 ($L_M < L_S$). The stator core 8 is provided at the opposite ends thereof with respective overhanging portions 15 that are not vis-à-vis the magnet 2 and have a length of X. The length X of the overhanging portions 15 is selected to be X=0.5 mm–8 mm when the air gap G formed between the magnet 2 and the front ends of the teeth 11 is 0.4 mm–1 mm. In the above described motor 1, G=0.4 mm and X=4.5 mm ($L_M$=37 mm, $L_S$=46 mm).

Figure 3:
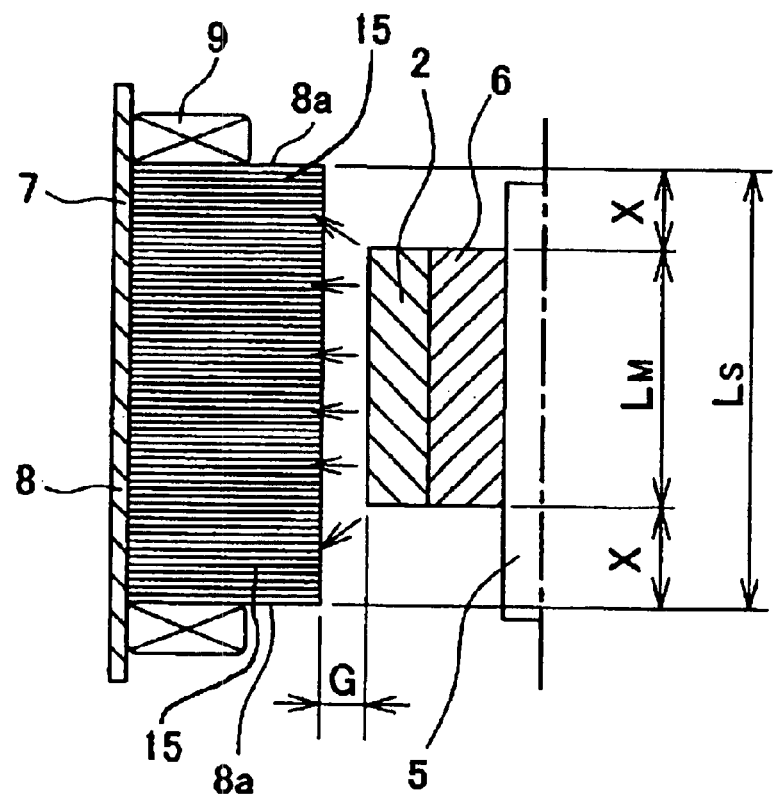
FIG. 3 is a schematic illustration of the flow of the magnetic flux of the brushless motor of FIG. 1 that has overhanging portions.
Figure 6:
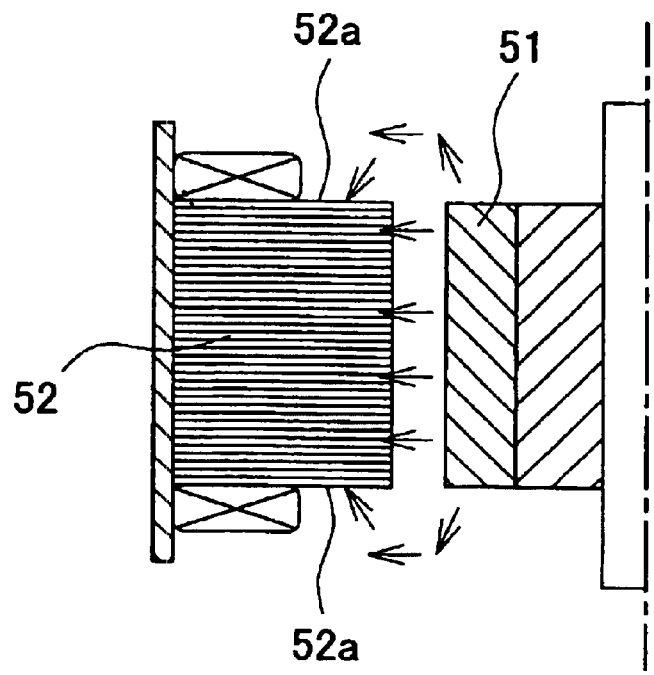
FIG. 6 is a schematic illustration of a known brushless motor, showing its configuration.
Figure 7:
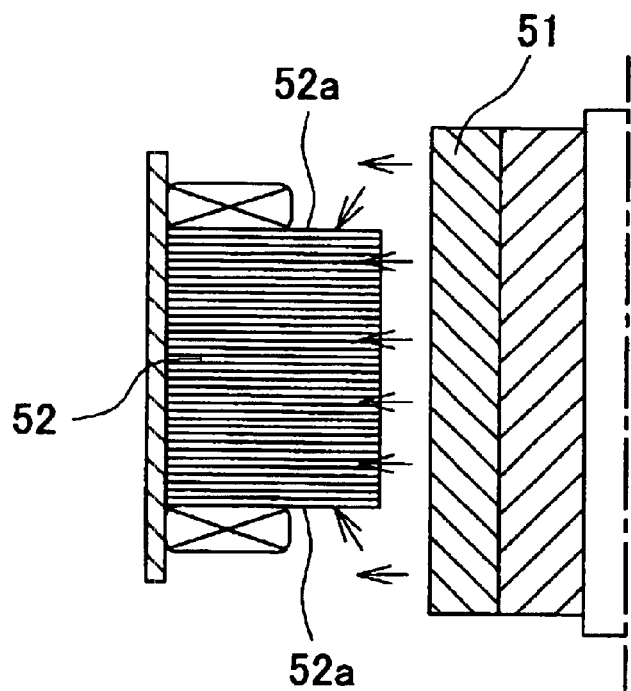
FIG. 7 is a schematic illustration of another known brushless motor, showing its configuration.

FIG. 3 is a schematic illustration of the flow of the magnetic flux of the brushless motor of FIG. 1 that has overhanging portions. As shown in FIG. 3, since the overhanging portions 15 are arranged at the respective opposite ends of the magnet 2, the magnetic flux flows into the stator core 2 radially as shown by arrows in FIG. 3. Therefore, it is possible to suppress the phenomenon that the magnetic flux partly turns around the end faces 8a of the stator core 8 as shown in FIGS. 6 and 7 and hence almost all the magnetic flux passes through the front ends of the teeth 11. As a result, the pseudo-multi-slot effect produced by the auxiliary grooves 12 is efficiently boosted to reduce cogging and other problems.

In an experiment conducted by the inventor of the present invention, using a motor 1 in which a value of X=4.5 mm ($L_M$=37 mm, $L_S$=46 mm) was selected for the length of the overhanging portions 15, a magnetic flux density of 34,000 Mx and an average cogging torque and an average torque loss for both forward and rearward revolutions of 0.005 Nm and 0.011 Nm were obtained. Thus, the cogging torque divided by the magnetic flux density was equal to $1.5 \times 10^{-7}$. On the other hand, in a motor in which X=0 mm ($L_M$=46 mm, $L_S$=46 mm: no overhangs) was selected, a magnetic flux density of 38,000 Mx and an average cogging torque and an average torque loss for both forward and rearward revolutions of 0.007 Nm and 0.013 Nm were obtained. Thus, the cogging torque divided by the magnetic flux density was equal to $1.8 \times 10^{-7}$. In other words, a reduction of cogging from 0.007 Nm to 0.005 Nm was achieved by a motor 1 having overhanging portions 15.

If the magnetic flux density is regarded as output, the cogging torque relative to the output is reduced in a motor 1 having overhanging portions 15 (from $1.8 \times 10^{-7}$ to $1.5 \times 10^{-7}$). In other words, it may be safe to say that the effective magnetic flux is increased in the motor 1 as a result of using the elongated stator core 8 to consequently increase the output and reduce the cogging torque if compared with a motor of the same size where X=0 mm.

Figure 4:
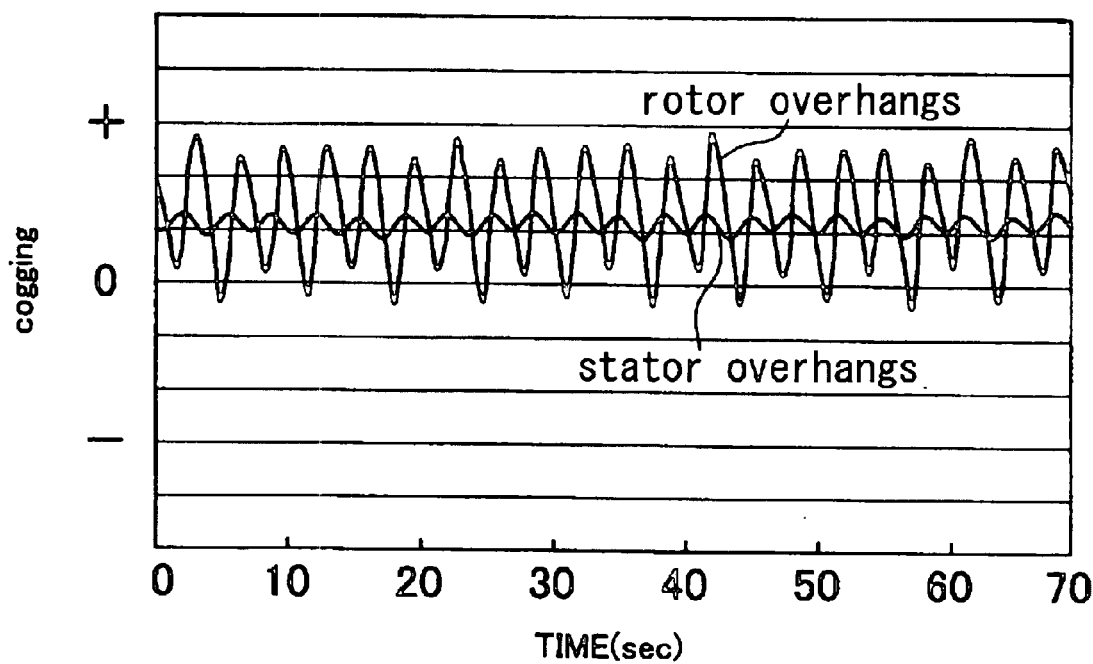
FIG. 4 is a graph illustrating the relationship between the extent of overhanging and the extent of cogging of the embodiment of the brushless motor according to the invention.

In a motor where X=−4.5 mm ($L_M$=46 mm, $L_S$=37 mm: having inversely overhanging portions, the magnet 2 being longer than the stator core) is selected, a magnetic flux density of 34,000 Mx and an average cogging torque and an average torque loss for both forward and rearward revolutions of 0.032 Nm and 0.012 Nm were obtained. Thus, the cogging torque divided by the magnetic flux density was equal to $9.4 \times 10^{-7}$. In other words, this represents a state as shown in FIG. 7, where the magnetic flux turns round in the axial directions to a large extent to give rise to large cogging. FIG. 4 is a graph illustrating the cogging of a conventional motor as observed in this state and that of the motor 1 for the purpose of comparison. As clearly seen from FIG. 4, the motor 1 is remarkably improved from the comparable motor in terms of cogging.

Figure 5:
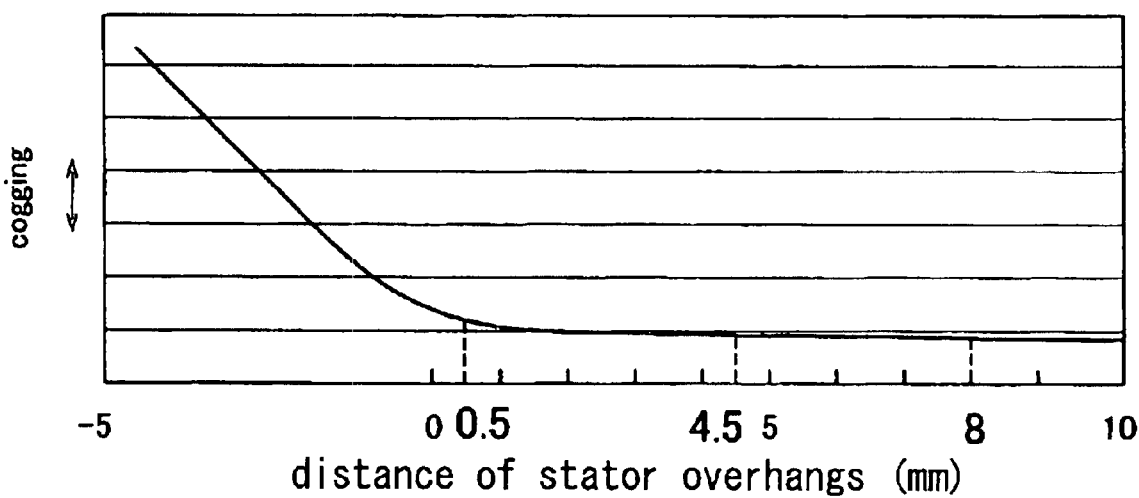
FIG. 5 is a graph illustrating the relationship between the extent of overhanging and the extent of cogging of a brushless motor whose magnet has inversely overhanging portions and hence in which the magnet is axially longer than the stator core.

FIG. 5 shows the relationship between the length of the overhanging portions and the cogging of motor that has become clear as a result of the experiment conducted by the inventor of the present invention. As shown in FIG. 5, the extent of cogging increases as the magnet 2 is made outstanding from (i.e., to extend beyond) the stator core 8 to have inversely overhanging portions. Cogging degreases gradually from no overhangs (X=0) to about X=0.5 mm and remains substantially at a constant level beyond the latter value although it may decrease only slightly.

Thus, since the stator core 8 is provided with overhanging portions 15 that are outstanding (i.e., extend) from the respective opposite ends of the magnet 2 in the motor 1, it is possible to suppress the phenomenon that the magnetic flux partly turns around the end faces 8a of the stator core 8. As a result, the pseudo-multi-slot effect produced by the auxiliary grooves 12 is efficiently boosted and hence it is possible to reduce cogging as well as the influence of the armature reaction, fluctuations of torque and inductances. Additionally, the magnetic flux flowing from the magnet 2 to the stator core 8 can be utilized efficiently to reduce the extent of cogging relative to the output so that the motor can be efficiently relieved of cogging. Thus, when the motor 1 is used as drive source of the EPS device of an automobile, noises and vibrations attributable to cogging can be reduced and the operation of steering the automobile is made very smooth to give the driver of the automobile a good touch of the steering wheel.

Additionally, since the armature reaction can be reduced as described above, the motor can be used in a state where the lead angle is nil (0°) to effectively suppress fluctuations of torque. Particularly, while it is difficult to define a mechanical lead angle for a motor adapted to revolve both forwardly and backwardly so as to be used with an EPS device and hence the lead angle has to be realized under complex control procedures, a motor according to the invention does not need such a complex control procedure so that it requires only a simple control procedure and therefore can effectively reduce the load of the CPU.

Detailed description has hereinabove been given of the invention achieved by the present inventor with reference to the embodiment. However, the present invention should not be limited to the embodiment described above, and may be variously modified within the scope not departing from the gist of the invention.

For example, the length X of the overhanging portions is made equal to 4.5 mm in the above described embodiment, the length X of the overhanging portions is by no means limited to 4.5 mm. It can be selected within a range between about 0.5 mm and about 8.0 mm depending on the specifications of the motor. Additionally, it is not necessary to make the overhanging portions at the respective opposite ends of the stator core 8 equal to each other. In other words, different lengths may be independently selected within the range of 0.5 mm and 8.0 mm for the overhanging portions depending on the layout-related requirements and the positional relationship between them and the Hall sensor 10. Particularly, in the case of a Hall sensor 10 adapted to detect the rotary position of the rotor by using the main magnetic flux of the magnet 2, if a large value is selected for the length X of the overhanging portion located at the side of the Hall sensor 10, the sensor 10 may give rise to a large sensing error because the magnet 2 and the Hall sensor 10 are then separated from each other by a large distance. Therefore, it is recommendable to select a relatively small value for the length X of the overhanging portion located at the side of the Hall sensor 10.

While the above described embodiment is an inner rotor type brushless motor, the present invention is also applicable to an outer rotor type brushless motor, in which the rotor is arranged outside the stator. Furthermore, while the above described embodiment is applied to a column assisting type EPS, it can be applied to an EPS other than the column assisting type, such as a rack assisting type. Additionally, a brushless motor according to the invention can find applications other than an EPS device that include industrial machines such as robots and IT devices such as personal computers and peripheral devices to name a few.

Since the axial length $L_S$ of the stator core is made greater than the axial length $L_M$ of the magnet in a brushless motor according to the invention, it has overhanging portions that are not vis-à-vis the magnet but outstanding from the respective opposite ends of the magnet that effectively suppress the parts of the magnetic flux flowing from the axial end faces into the stator core. As a result, the pseudo-multi-slot effect produced by the auxiliary grooves is efficiently boosted to reduce cogging and other problems.

What is claimed is:

1. A brushless motor comprising a rotor having a magnet with an axial length of $L_M$ and a stator having a stator core provided with a plurality of teeth arranged peripherally vis-à-vis said magnet with an air gap interposed between them and said magnet and having auxiliary grooves formed at the front ends thereof,
    wherein said stator core and said magnet are arranged such that the axial length $L_s$ of said stator core is greater than the axial length $L_M$ of said magnet ($L_s > L_M$), and said stator core is provided with overhanging portions thereof that are not vis-à-vis the magnet but axially outstanding from the respective axial ends of the magnet, so as to prevent magnetic flux from flowing into said stator core through axial end faces thereof.

2. A brushless motor according to claim 1, wherein the overhanging portions have an axial length X between 0.5 mm and 8.0 mm.

3. A brushless motor according to claim 1, wherein the center of each of said auxiliary grooves of each of said teeth is located on a radial line extending from the corresponding circumferential end face of the teeth.

4. A brushless motor according to claim 1, wherein said auxiliary grooves are made to have a width equal to the width of the slots separating adjacent teeth.

5. A brushless motor according to claim 1, adapted to be used as a drive source of an electric power steering device.

6. A brushless motor according to claim 3, wherein the center position of said auxiliary groove is located at a position where the magnetic flux shows a high density along the front end of said teeth, and a magnetic path of reactive magnetic flux of an armature is narrowed and a magnetic path resistance becomes large.

7. A brushless motor comprising:
    a rotor having a magnet and a rotor core, each of said magnet and said rotor core having an axial length of $L_M$;

a stator having a stator core provided with a plurality of teeth arranged peripherally vis-à-vis said magnet with an air gap interposed between them and said magnet and having auxiliary grooves formed at the front ends thereof;

wherein the axial length $L_s$ of said stator core is greater than the axial length $L_M$ of said magnet and said rotor core ($L_s > L_M$); and wherein said stator core is provided with overhanging portions thereof that are not vis-à-vis the magnet but axially outstanding from the respective axial ends of the magnet.

8. A brushless motor according to claim 7, wherein said rotor core is disposed radially inwardly of said magnet.

9. A brushless motor according to claim 7, wherein the overhanging portions have an axial length X between 0.5 mm and 8.0 mm.

10. A brushless motor according to claim 7, wherein the center of each of said auxiliary grooves of each of said teeth is located on a radial line extending from the corresponding circumferential end face of the teeth.

11. A brushless motor according to claim 7, wherein said auxiliary grooves are made to have a width equal to the width of the slots separating adjacent teeth.

12. A brushless motor according to claim 7, adapted to be used as a drive source of an electric power steering device.

13. A brushless motor according to claim 7, wherein the center position of said auxiliary groove is located at a position where the magnetic flux shows a high density along the front end of said teeth, and a magnetic path of reactive magnetic flux of an armature is narrowed and a magnetic path resistance becomes large.

* * * * *